(12) United States Patent
Cvorovic

(10) Patent No.: US 7,279,905 B2
(45) Date of Patent: Oct. 9, 2007

(54) METHOD AND AN APPARATUS FOR SUPERVISING THE OPERATION OF CURRENT TRANSFORMERS

(75) Inventor: Branislav Cvorovic, Stafford (GB)

(73) Assignee: Areva T&D UK Limited, Stafford St (GB)

( * ) Notice: Subject to any disclaimer, the term of this patent is extended or adjusted under 35 U.S.C. 154(b) by 0 days.

(21) Appl. No.: 11/359,213

(22) Filed: Feb. 21, 2006

(65) Prior Publication Data

US 2006/0198073 A1 Sep. 7, 2006

(30) Foreign Application Priority Data

Feb. 22, 2005 (GB) ................. 0503592.8

(51) Int. Cl.
G01R 31/08 (2006.01)
G01R 31/06 (2006.01)
H02H 3/26 (2006.01)

(52) U.S. Cl. .............. 324/522; 324/547; 361/76
(58) Field of Classification Search ......... 324/522, 324/547; 361/76

See application file for complete search history.

(56) References Cited

U.S. PATENT DOCUMENTS

| 3,225,256 | A | * | 12/1965 | Carter et al. ............ 361/76 |
| 4,297,740 | A | * | 10/1981 | Hagberg ............... 361/67 |
| 4,600,961 | A | * | 7/1986 | Bishop ................. 361/76 |
| 4,745,512 | A | * | 5/1988 | Hampson ............... 361/76 |
| 4,795,983 | A | * | 1/1989 | Crockett et al. .......... 324/522 |
| 5,172,329 | A | * | 12/1992 | Rahman et al. ........... 361/35 |
| 6,308,140 | B1 | * | 10/2001 | Dowling et al. .......... 324/772 |
| 6,396,279 | B1 | * | 5/2002 | Gruenert ............... 324/424 |
| 6,525,543 | B1 | * | 2/2003 | Roberts et al. .......... 324/522 |
| 6,559,652 | B2 | | 5/2003 | Carrillo ............... 324/522 |
| 6,654,216 | B2 | * | 11/2003 | Horvath et al. ........... 361/42 |
| 6,757,626 | B2 | * | 6/2004 | Dougherty et al. ......... 361/42 |
| 6,922,318 | B2 | * | 7/2005 | Matsumoto et al. ........ 361/42 |
| 2003/0142450 | A1 | * | 7/2003 | Bo .................... 361/62 |
| 2004/0090728 | A1 | | 5/2004 | Wang et al. ............ 361/93.9 |

FOREIGN PATENT DOCUMENTS

EP 1 324 453 A2 7/2003

* cited by examiner

*Primary Examiner*—Walter Benson
*Assistant Examiner*—Timothy J Dole
(74) *Attorney, Agent, or Firm*—Thelen Reid Brown Raysman & Steiner LLP

(57) ABSTRACT

A method of supervising the operation of a plurality of current transformers arranged in respective groups and connected to a protection relay forming part of a three-phase electrical power system includes determining a current ratio at an output of each group of current transformers, comparing each current ratio with a predetermined high ratio, comparing each current ratio with a predetermined low ratio, and generating a fault indication when the current ratio at one location exceeds the predetermined high ratio and the current ratio at the or each other location remains below the predetermined low ratio.

14 Claims, 2 Drawing Sheets

METHOD AND AN APPARATUS FOR SUPERVISING THE OPERATION OF CURRENT TRANSFORMERS

CROSS-REFERENCE TO RELATED APPLICATION

Figure 1:
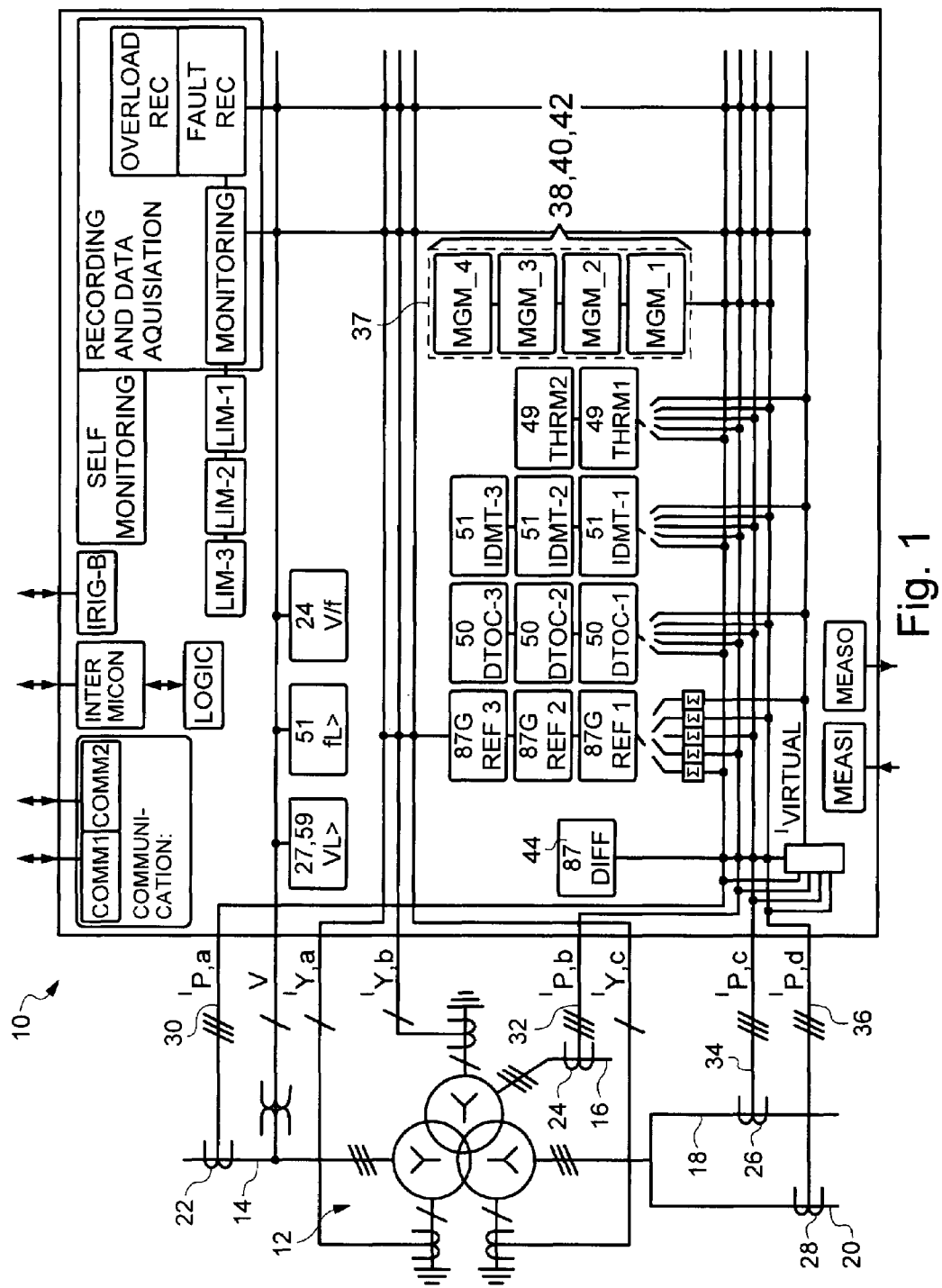

This application claims priority to French Application No. 0503592.8, filed on Feb. 22, 2005, entitled: "A Method and an Apparatus for Supervising the Operation of Current Transformers" by Branislav Cvorovic and was not published in English.

This invention relates in particular, but not exclusively, to a method of supervising the operation of a plurality of current transformers connected to a protection relay. The invention also relates to an apparatus for supervising the operation of a plurality of current transformers.

Protection relays are used within electrical power systems, such as three-phase power transmission systems, to detect abnormal operating conditions. On detection of such a condition the protection relay operates a tripping mechanism of a circuit breaker, thereby opening the electrical circuit to protect electrical components such as transmission lines, cables and transformers.

A protection relay detects an abnormal operating condition by monitoring the current within a given electrical power system. The current is supplied to the protection relay via two or more groups of three-phase current transformers. A group consists of a set of three individual current transformers, one for each phase.

An internal fault within a current transformer, or in the connection between a current transformer and the protection relay, results in the current being monitored by the protection relay differing from the actual current in the remainder of the power system.

This leads to the protection relay spuriously operating the tripping mechanism, thereby unnecessarily disconnecting the transmission line, cable or transformer which results in an interruption of the electrical supply to downstream components and customers.

This problem is particularly apparent in differential protection relays such as line differential and transformer differential relays. This is because differential relays typically compare a current flowing into an apparatus within a power system with the current flowing out of the apparatus.

The detection of a current transformer fault can be used to prevent the protection relay spuriously operating the tripping mechanism. Operation of the protection relay can be inhibited by blocking the relay's input elements.

Alternatively, spurious operation can be prevented (i.e. stability maintained), despite the current input to the relay being in error, by reducing the trip sensitivity of the relay. This allows the relay to continue to provide a degree of protection.

One way of determining a fault in a current transformer, or the connection therefrom, i.e. a way of supervising the current transformer, is to compare each of three phase currents entering a protection relay with each of the corresponding voltage inputs to the relay. Such a technique is commonly used in feeder protection relays which include voltage inputs.

However, differential protection relays often do not include a full set of voltage transformer inputs. As a result it is not always possible to supervise the current transformer by comparing a current supplied to the protection relay with a corresponding voltage input to the relay.

A further technique of supervising a current transformer involves comparing a neutral current flowing into an apparatus within a power system with a neutral current flowing out of the apparatus. A neutral current is the vector result derived from a summation of the three phase currents in a group of three-phase current transformers. The term "neutral" is equivalent to, and interchangeable with the term "residual".

System earthing and transformer vector group connections, amongst other power system variables, affect the measurement of neutral current. For example, in transformer applications, the distribution of neutral current within the power system is unpredictable. This is because certain winding inputs to the protection relay will include trapped neutral current as a result of the vector group of the transformer. Consequently neutral current comparison does not permit any meaningful supervision of current transformers in such power system arrangements.

Another technique of supervising a current transformer involves comparing a delta step-change current at the various winding terminals of a transformer. Delta techniques are commonly used in protection relay applications. A power system characteristic is determined and then compared with the same characteristic as determined an exact number of power system cycles earlier. Any magnitude or vector change during the intervening period is referred to as the "delta".

However, the delta condition occurs only instantaneously. As a result, once spurious operation of the tripping mechanism has been prevented it is necessary to maintain the protection relay in a blocked state thereafter. Only once remedial work has been undertaken could an operative manually reset the supervision procedure. This is because the delta condition technique is unable to determine whether the current transformer is still in a fault condition, or whether operative remedial attention or intermittent effects have now removed the fault.

Therefore it is a general aim of the invention to provide a method of supervising the operation of current transformers which:

(i) does not rely on voltage inputs;
(ii) is unaffected by the configuration of the power system; and
(iii) is able to self-reset without operative intervention.

According to a first aspect of the invention there is provided a method of supervising the operation of a plurality of current transformers arranged in respective groups and connected to a protection relay forming part of a three-phase electrical power system, comprising the steps of:

(i) determining a current ratio at an output of each group of current transformers;
(ii) comparing each current ratio with a predetermined high ratio;
(iii) comparing each current ratio with a predetermined low ratio; and
(iv) generating a fault indication when the current ratio at one location exceeds the predetermined high ratio and the current ratio at the or each other location remains below the predetermined low ratio.

Each current ratio provides an indication of the degree of unbalance between the three phases at the output of each group of three-phase current transformers. The use of a ratio results in the determined value being biased according to the prevailing load flow. In this way the level of prevailing load current and the configuration of the electrical power system have no affect on the supervision of the current transformers.

In addition, the use of a current ratio omits the need to compare a given current with a corresponding voltage, thereby allowing the method of the invention to be applicable to a wide range of power system configurations.

Furthermore, the foregoing method allows for the continuous monitoring of the status of the current transformers. This permits the automatic resetting of the supervision procedure, while load current continues to flow through the protected electrical power system, following recovery of the current transformer fault.

Preferably determining a current ratio includes determining the ratio of negative phase sequence current to positive phase sequence current. Such a ratio provides the desired immunity from the prevailing load current and the power system configuration.

Conveniently the method of the invention further includes the setting of at least one of the predetermined high ratio and the predetermined low ratio by an operative. This allows for the tailoring of the supervision method to a particular installation or application.

A preferred embodiment of the method of the invention includes the setting of the predetermined high ratio at 40% and the predetermined low ratio at 5%. These values provide for a reliable way of detecting current transformer faults.

Preferably the method of the invention further includes, following step (iv), the optional step of blocking differential elements of the protection relay. Blocking differential elements of the protection relay prevents the protection relay from spuriously operating the tripping mechanism.

Conveniently the method of the invention further includes, following step (iv), the optional step of decreasing a differential trip sensitivity of the protection relay. This maintains stability while allowing the relay to continue to provide a degree of protection.

According to a second aspect of the invention there is provided a protection relay including a module, for supervising the operation of a plurality of current transformers arranged in respective groups and connected to the relay forming part of a three-phase electrical power system, the module comprising:
 a determinator for determining a current ratio at an output of each group of current transformers;
 a comparator for comparing each current ratio with a predetermined high ratio and a predetermined low ratio; and
 an indicator for generating a fault indication when the current ratio at one location exceeds the predetermined high ratio and the current ratio at the or each other location remains below the predetermined low ratio.

The protection relay of the invention shares the advantages of the corresponding elements of the method of the invention.

Figure 2:
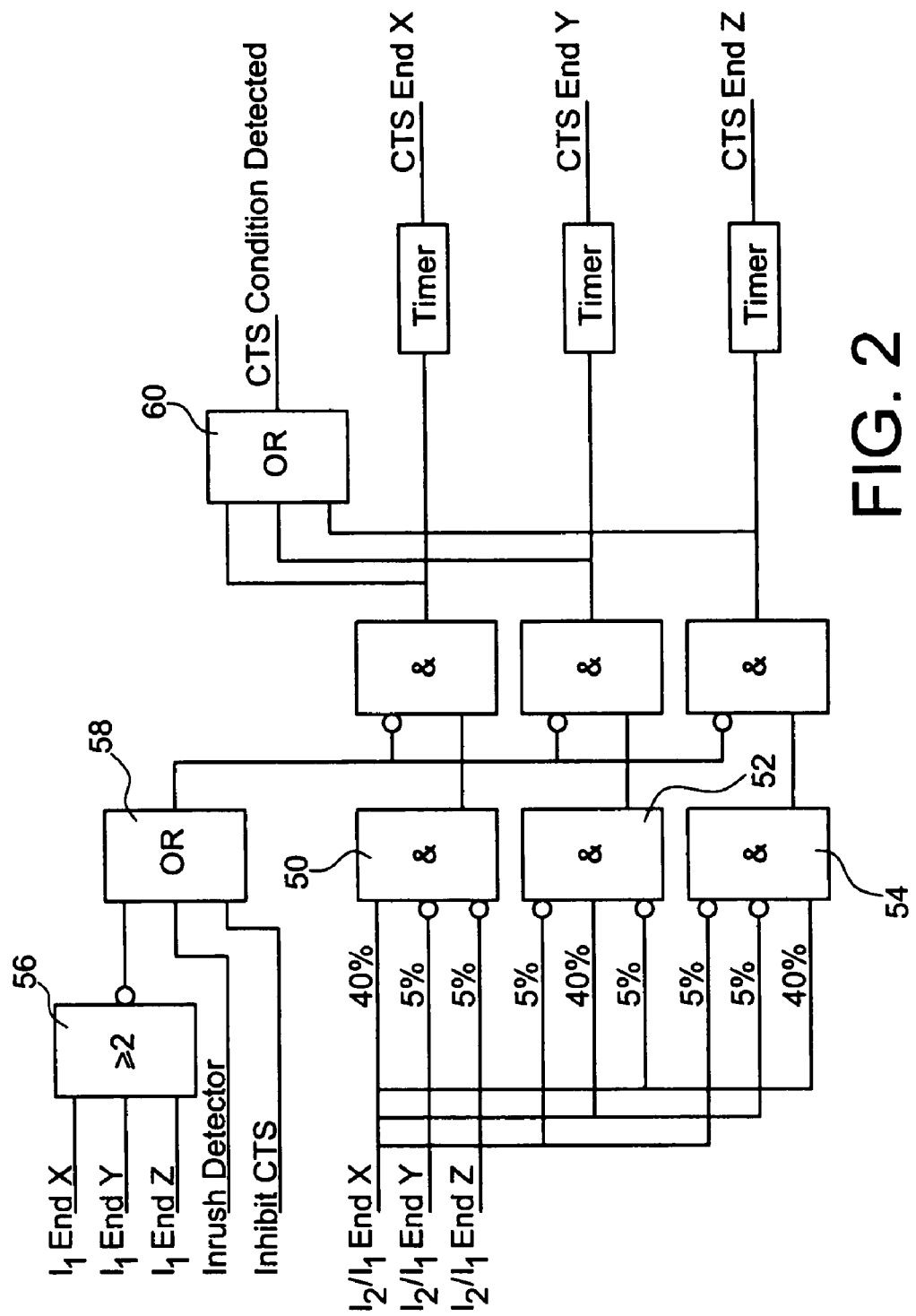

There now follows a brief description of a preferred embodiment of the invention, by way of non-limiting example, with reference being made to the accompanying drawings in which:

FIG. 1 shows a schematic view of a protection relay according to an embodiment of the invention protecting a power transformer; and FIG. 2 shows a schematic view of a logic arrangement embodying a supervision method according to an embodiment of the invention.

A protection relay according to a first embodiment of the invention is designated generally by the reference numeral 10. The protection relay 10 is a differential protection relay.

The protection relay 10 is part of a power system. The power system includes a power transformer 12 which is connected to, and protected by, the protection relay 10. For simplicity, the schematic follows the typical power system practice of showing a "one-line diagram". This allows a three phase system to be represented as a single phase diagram.

In the embodiment shown, the protection relay 10 is connected to a first, second, third and fourth location 14, 16, 18, 20 in the power system via a first, second, third and fourth group of three-phase current transformers 22, 24, 26, 28. The connection of each group 22, 24, 26, 28 to the relay 10 is three phase, as denoted by the /// hatching in the one-line diagram of FIG. 1.

The protection relay includes a module 37 for supervising each current transformer in the groups of three-phase current transformers 22, 24, 26, 28.

A determinator 38 within the module 37 determines the current ratio at an output 30, 32, 34, 36 of each group of transformers 22, 24, 26, 28. In the embodiment shown the determinator 38 is a microcontroller module. The microcontroller module is programmed in such a way as to perform digital signal processing.

The current at each output 30, 32, 34, 36 is three-phase current. The current ratio provides an indication of the degree of unbalance between the three current phases at the output 30, 32, 34, 36 of each group of three-phase current transformers 22, 24, 26, 28.

The module 37 also includes a comparator 40 for comparing each current ratio with a predetermined high ratio and a predetermined low ratio. In the embodiment shown the comparator 40 is a microcontroller module.

An indicator 42 is also included in the module 37. The indicator 42 is for generating a fault indication when the current ratio at one output 30, 32, 34, 36 exceeds the predetermined high ratio and the current ratio at the or each other output 30, 32, 34, 36 remains below the predetermined low ratio. In the embodiment shown the indicator 42 is a microcontroller module.

In use, the protection relay 10 determines the current ratio at the output 30, 32, 34, 36 of each group of three-phase current transformers 22, 24, 26, 28. In a preferred embodiment the current ratio is the ratio of negative phase sequence current to positive phase sequence current.

Positive phase sequence is a concept used in the analysis of three phase power networks, whereby a healthy balanced network will operate with only positive phase sequence current and voltage. Negative phase sequence will be experienced only when the three phase current or voltage vectors do not form a balanced set.

Other possible current ratios include the use of neutral phase sequence current or zero phase sequence current instead of negative phase sequence current in the ratio.

Zero phase sequence current is a concept used in the analysis of three phase power networks. It gives a calculation result equal to one third of the neutral current.

In addition, any measured phase current, or a statistical combination of the magnitudes of current in the three phases may be used instead of the positive phase sequence current in the ratio. Such statistical combinations may include an average, minimum, or a maximum.

Each current ratio determined by the protection relay 10 represents a degree of unbalance between the three current phases at each output 30, 32, 34, 36. The positive phase sequence current reflects the loading in the power system and therefore biases the ratio according to the prevailing loading within the power system.

Consequently, any load or genuine fault condition in the power system will affect each current ratio equally.

According to a further step in the method of the invention, the protection relay 10 compares each current ratio with a predetermined high ratio and a predetermined low ratio. In the preferred embodiment of the method the high ratio is 40% and the low ratio is 5%.

An additional step of the method of the invention involves generating a fault indication when the current ratio at one output 30, 32, 34, 36 exceeds the predetermined high ratio, and the current ratio at the or each other output 30, 32, 34, 36 remains below the predetermined low ratio.

A genuine problem with a current transformer, i.e. an internal fault or an open circuit in the connection between the current transformer and the protection relay, will typically result in a high degree of unbalance between the current phases at the output 30, 32, 34, 36 of the group of three-phase current transformers which the problematic current transformer, or defective connection therefrom. This results in the determination of a current ratio of between 50% and 100% at the said output 30, 32, 34, 36.

Since the prevailing load within the power system is balanced, the degree of unbalance between the three current phases at each other output 30, 32, 34, 36 will remain low. As a result the current ratio at each other output 30, 32, 34, 36 will also remain low, typically below 5%.

Accordingly, the method of the invention is able to distinguish between a change in load or genuine power system fault condition and a fault with a current transformer, or its connection to a relay.

On detection of a current transformer fault it may be desirable to block the differential elements 44 of the protection relay 10. In this way the relay 10 is prevented from spuriously operating a circuit breaker which is used to isolate the power transformer in the event of a genuine fault condition in the power system.

Alternatively, it may be desirable to reduce the sensitivity of the differential elements 44 following detection of a current transformer fault. In this way the protection relay 10 is able to reduce the likelihood of spurious operation of the circuit breaker while retaining a degree of protection to the power transformer 12.

Other electrical power system items, such as a line or cable, are also protectable by the differential elements 44 of a protection relay 10. Consequently, blocking or reducing the sensitivity of the differential elements 44 may also be employed in such arrangements.

In another embodiment of the method it is desirable to include a further step of checking whether sufficient current is flowing in the line, cable or transformer being protected in order to allow supervision of the current transformer to take place.

A further embodiment of the method may preferably include an additional step of detecting transformer magnetising inrush in order to inhibit the supervision of the current transformers.

Magnetising inrush current flows when a power transformer is switched on and results in a high amount of current flowing into one winding terminal only. This elevated level of current may be sufficient to cause an unbalance in the current ratio at the output of the group of three-phase current transformers connected to the said winding terminal, thereby leading to spurious detection of a current transformer problem.

FIG. 2 shows a schematic view of a logic arrangement according to a preferred embodiment of the invention.

Each of Ends X Y Z corresponds to first, second and third locations, within a three-phase electrical power system, from which three-phase currents are sampled via their respective current transformers.

The series of "&" (AND) logic gates 50, 52, 54 compares the current ratio (designated $I_2/I_1$) at each location with the predetermined high and low ratios.

The "≧2" logic gate 56 checks whether sufficient current (designated $I_1$) is flowing in the line, cable or transformer being protected in order to allow supervision of the current transformers to take place. Current must flow into or out from at least two locations of the electrical power system. As a result the logic gate checks for ≧2 inputs.

A first "OR" gate 58 permits the additional check for transformer magnetising inrush.

A second "OR" gate 60 indicates a current transformer fault if one of the "&" gates 50, 52, 54 detects one of the current ratios exceeding the predetermined high ratio and each of the other current ratios remaining below the predetermined low ratio.

The invention claimed is:

1. A method of supervising the operation of a plurality of current transformers arranged in respective groups and connected to a protection relay forming part of a three-phase electrical power system, comprising the steps of:
   (i) determining a current ratio at an output of each group of current transformers;
   (ii) comparing each current ratio with a predetermined high ratio;
   (iii) comparing each current ratio with a predetermined low ratio; and
   (iv) generating a fault indication when the current ratio at one location exceeds the predetermined high ratio and the current ratio at the or each other location remains below the predetermined low ratio.

2. A method according to claim 1 wherein determining a current ratio includes determining the ratio of negative phase sequence current to positive phase sequence current.

3. A method according to claim 1 further including the setting of at least one of the predetermined high ratio and the predetermined low ratio by an operative.

4. A method according to claim 1 including the setting of the predetermined high ratio at 40% and the predetermined low ratio at 5%.

5. A method according to claim 4 further including, following step (iv), the step of blocking differential elements of the protection relay.

6. A method according to claim 4 further including, following step (iv), the step of decreasing a differential trip sensitivity of the protection relay.

7. A method according to claim 3 further including, following step (iv), the step of blocking differential elements of the protection relay.

8. A method according to claim 3 further including, following step (iv), the step of decreasing a differential trip sensitivity of the protection relay.

9. A method according to claim 2 including the setting of the predetermined high ratio at 40% and the predetermined low ratio at 5%.

10. A method according to claim 9 further including, following step (iv), the step of blocking differential elements of the protection relay.

11. A method according to claim 9 further including, following step (iv), the step of decreasing a differential trip sensitivity of the protection relay.

12. A method according to claim 1 further including, following step (iv), the step of blocking differential elements of the protection relay.

13. A method according to any of claim 1 further including, following step (iv), the step of decreasing a differential trip sensitivity of the protection relay.

14. A protection relay including a module, for supervising the operation of a plurality of current transformers arranged in respective groups and connected to the relay forming part of a three-phase electrical power system, the module comprising:

a determinator for determining a current ratio at an output of each group of current transformers;

a comparator for comparing each current ratio with a predetermined high ratio and a predetermined low ratio; and an indicator for generating a fault indication when the current ratio at one location exceeds the predetermined high ratio and the current ratio at the or each other location remains below the predetermined low ratio.

* * * * *